Patented Mar. 7, 1944

2,343,435

UNITED STATES PATENT OFFICE 2,343,435

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,126

19 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oils of internal combustion engines the dirt removal rate of filtering media may be sharply increased by contacting the oil that is filtered by the filtering medium with a basic ester amine product which contains an acyl-oxy group

derived from a detergent-forming monobasic carboxy acid having at least 8 carbon atoms and attached to an alkyl group that in the ester amine product occupies an amino-hydrogen position and which product does not contain a polybasic carboxy acid residue. The ester product may be added to the filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having high dirt removal rate.

The detergent-forming monobasic carboxy acids which supply the acyl-oxy group of the product which may be used to increase the dirt removal rate of filtering media according to this invention are those acids having at least 8 carbon atoms which have the capacity to react with alkali to form soap or soap-like products and are exemplified by fatty acids containing 8 to 32 carbon atoms such as oleic, linoleic, ricinoleic, stearic, hydroxy-stearic, palmitic, linolenic, erucic, clupanodonic, myristic, etc., and such fatty acids are normally regarded as preferable. The term detergent-forming carboxy acid includes naphthenic acids. Naphthenic acids are derived from various petroleums or are obtained by treatments which involve oxidation of hydrocarbon bodies present in naturally occurring crude oils. The number of carbon atoms in naturally occurring naphthenic acids may vary from 10 carbon atoms to 38 carbon atoms. When a naphthenic acid is employed it is preferred to use naphthenic acids or acid mixtures of the type that are readily available in the open market, e. g., an acid or acid mixture having a molecular weight between about 200 and 575 and a boiling range varying from about 230° C. to about 310° C. Such naphthenic acids are soluble in 65% ethyl alcohol when 10% of naphthenic acid is added but are insoluble when only 5% is added. They also have a low iodine number, e. g. below about 2 or 3 as determined by the Hubl-Waller method. The saponification number preferably should be in the neighborhood of 250. Naphthenic acids of the kind described are readily esterified with glycerine to form naphthenin in intimate admixture and agitation in the presence of dried hydrochloric acid gas using a procedure that is substantially the same as that usually used in the formation of stearin from stearic acid and glycerol. It is known that such naphthenic acids can be treated, for example, with halogens so as to produce derivatives such as chlornaphthenic acids. Also included among the detergent-forming acids are those mono-carboxy acids sometimes called wax acids or paraffin acids, which are formed as a result of oxidation of paraffin or petroleum waxes, particularly those derived from paraffin base petroleums, and which include hydroxylated as well as non-hydroxylated acids. Acids occurring in certain waxes such as carnaubic acid, cerotic acid, lanopalmic acid and lanoceric acid, are considered detergent-forming mono-carboxy acids. Rosin or resinic acids such as abietic acid are likewise included. Such acid materials due to the fact that they react with alkalis to form soap or soap-like products are commonly called detergent-forming acids. They are referred to herein as mono-carboxy acids in order to differentiate them from such materials as are obtained by the sulphonation of naphthenic acids or carboxy abietene. Such mono-basic carboxy detergent-forming acids or suitable derivatives thereof such as esters derived from monohydric, dihydric or trihydric alcohols may be used as will be described below to form products suitable for increasing the dirt removal rate of filtering media. Not only may such carboxy acids and their esters be employed but also suitable derivatives such as acyl chlorides, or anhydrides, and in fact any form is suitable that supplies an acyl-oxy radical of the selected acid.

In addition to common mono-carboxy fatty acids and other detergent-forming monocarboxy acids, we may also employ fatty acids and partial esters of fatty acids obtained by drastic oxidation of non-drying and semi-drying oils such as castor oil, sunflower seed oil, cotton seed oil, rapeseed oil, soybean oil, and the like. Acids and esters prepared from such blown or drastically oxidized oils are obtainable in the open market. Other detergent-forming acids suitable for employment in the preparation of ester products useful according to this invention may be prepared by blowing or otherwise oxidizing unsaturated fatty acids, such as castor oil fatty acids, soybean fatty acids, oleic acid and the like. Drying oils which have been hydroxylated by oxidation, or similar process, may also be used. The oxidation may be by air, ozone, oxygen, organic peroxides, potassium permanganate, or the like. Other functional equivalents are also regarded as detergent-forming carboxy acids. For example, chlorinated ricinoleic acid or brominated oleic acid may be used instead of ricinoleic acid or oleic acid. Dichlor stearic acid or oleic acid dichloride may be used. Hydrogenated abietic acid may be used instead of abietic acid. It is also possible to condense two moles of ricinoleic acid and produce one mole of monobasic diricinoleic acid. Likewise monobasic triricinoleic acid and monobasic tetraricinoleic acid may be used. Furthermore, the condensation product of a substance such as ricinoleic acid or hydrostearic acid with some non-fatty acid such as lactic acid may be used. It is to be understood that the term detergent-forming mono-carboxy acid radical includes radicals derived from such functional equivalents.

The reaction between a detergent-forming mono-basic carboxy acid and a hydroxy alkyl amine to form a suitable ester amine product may be illustrated by the reaction between a detergent-forming acid, e. g. a fatty acid, and a simple amine such as ethanol diethyl amine as follows, the fatty acid being indicated as RCOOH which contains the conventional acyl oxy radical RCOO:

RCOOH+OH.C₂H₄N(C₂H₅)₂→
　　　　　RCOOC₂H₄N(C₂H₅)₂+H₂O

Similarly the reaction may involve an ester of a detergent-forming monobasic carboxy acid, e. g. a glyceride. For example, a triglyceride, e. g. castor oil, may react with triethanol amine to obtain ester products which, depending upon the molecular ratios involved, may be

RCOOC₂H₄.N.(C₂H₄OH)₂

(RCOOC₂H₄)₂NC₂H₄OH (RCOOC₂H₄)₃N

Or utilizing a detergent-forming acid glyceride and diethanol amine the reaction may be (RCOO)₃C₃H₅ + 3HN(C₂H₄OH)₂ —→

Ester amines in the nature of primary and secondary amines may likewise be produced in other ways, the following being illustrative.

RCOOH+OHC₂H₄OH→RCOOC₂H₄OH

RCOOC₂H₄OH+HCl→RCOOC₂H₄Cl

RCOOC₂H₄Cl+HN₃→RCOOC₂H₄NH₂

The glycol OHC₂H₄OH may also be used in the anhydride form C₂H₄O. The primary amine produced in the manner indicated can be converted to a secondary alkylol amine by the following reaction, RCOOC₂H₄NH₂ + OHC₂H₄Cl ——→ 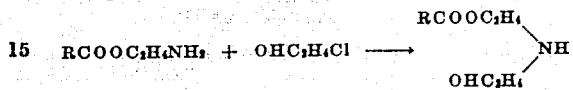

Or the same secondary alkylol amine may be produced by the following reaction,

RCOOC₂H₄Cl + HHNC₂H₄OH ——→ 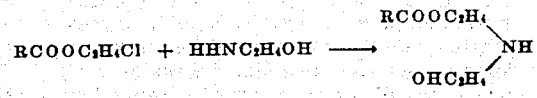

By a similar reaction a secondary alkylamine may be produced,

RCOOC₂H₄Cl + HHNC₂H₅ ——→ 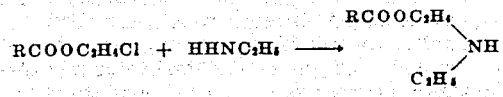

It is also possible to obtain compounds wherein one or two alkylol groups in an aminohydrogen position is replaced by an alkyl ester group wherein the alkyl radical is acylated by a monocarboxy acid having less than 8 carbon atoms provided there is at least 1 ester alkyl group in an amino-hydrogen position containing an acyl-oxy group derived from a detergent-forming monobasic carboxy acid. For example, an acetylated triethanol amine may be utilized wherein the acetyl radical replaces one hydrogen of one of the hydroxyl ethyl radicals. Upon reaction with a detergent-forming carboxy acid a suitable ester product could be produced having for example the formula

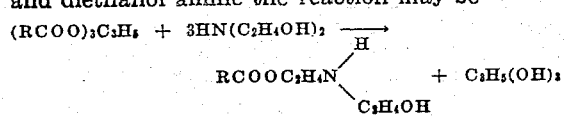

Alkyl ester groups in an amino-hydrogen position wherein the alkyl radical is acylated by a polybasic carboxy acid are not included.

In compounds of the character above described it is apparent that the C₂H₄ radical which is selected for purposes of examplification may be replaced by some other divalent alphyl radical such as C₃H₆, C₄H₈, C₅H₁₀, etc., which may be represented more generally as the radical CₙH₂ₙ wherein n denotes some small whole number preferably less than 10. In a similar way the C₂H₅ radical may be replaced by other members of the series methyl, ethyl, proply, butyl, amyl, hexyl, octyl, etc. and may be indicated more generally by CₙH₂ₙ₊₁ wherein n has the same significance above mentioned. The compounds above described may, therefore, be represented, for the sake of brevity, by the following formula.

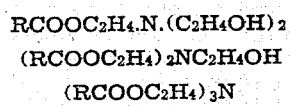

in which m is 1, 2 or 3; m' is 0, 1 or 2 with the proviso that m+m'=3; RCOO is an acyl-oxy group containing at least 8 carbon atoms derived from a detergent-forming monobasic carboxy acid having at least 8 carbon atoms; T is a hydrogen atom, or CₙH₂ₙ₊₁, or a group OHC₂H₂ₙ, or a group R'COOC$_n$H$_{2n}$ wherein R'COO is a monocarboxy acid radical having less than 8 carbon atoms; and $n$ is a small whole number preferably less than 10.

Whether the radicals above mentioned are in the form C$_n$H$_{2n}$ or are in the form C$_n$H$_{2n+1}$ they are regarded as being embraced within the term alkyl. Moreover, the alkyl radical instead of being of the type methyl, ethyl, propyl, etc., may be an alicyclic radical such as cyclohexyl or may be aralkyl such as a benzyl radical. It is also to be understood that alkyl oxy alkyl radicals are included in the term alkyl, the following being illustrative of alkylol amines containing such groups.

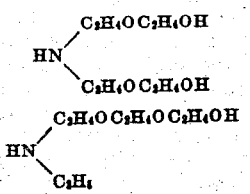

Accordingly, the term alkyl is used in a broad sense as including alphyl, aralkyl, alicyclic and oxyalkyl radicals (but not aryl radicals) whether in mono-valent form, e. g. C$_n$H$_{2n+1}$, or in divalent form, e. g. C$_n$H$_{2n}$. Similarly the term hydroxy alkyl includes hydroxy alicyclic, hydroxy aralkyl and hydroxy alkyl oxy alkyl as well as simple hydroxy aliphatic radicals. It is to be understood, however, that in hydroxy aralkyl radicals the hydroxyl is attached to the alphyl part and not to the aryl part of the aralkyl radical. It may further be pointed out that a hydroxy alkyl radical may be derived from a glycerine or a polyglycerol, the following being illustrative.

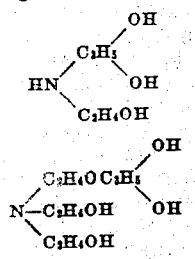

In such cases the radicals C$_3$H$_5$OH or

C$_2$H$_4$OC$_3$H$_5$OH are the functional equivalents of the C$_n$H$_{2n}$ radical. The OH group in these radicals may, if desired, be replaced by esterification with any available carboxyl.

Having the foregoing in mind suitable ester products may be represented by the formula—

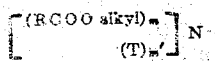

in which $m$ is 1, 2 or 3; $m'$ is 0, 1 or 2 with the proviso that $m+m'=3$; RCOO is an acyl-oxy group containing at least 8 carbon atoms derived from a detergent forming monobasic carboxy acid having at least 8 carbon atoms; and T is a hydrogen atom, or an alkyl radical, or a hydroxy alkyl radical or a radical (R'COO alkyl) wherein R'COO is an acyl-oxy group containing less than 8 carbon atoms derived from a monocarboxy acid having less than 8 carbon atoms.

In referring to the hydroxy alkyl group of an alkyl amine suitable for esterification with the carboxyl group of a detergent-forming monobasic carboxy acid, we do not include amines of the type where a hydroxy acyl radical replaces a hydrogen atom of the hydroxyl portion of the hydroxy alkyl radical, unless there is another group in the form of an hydroxy alkyl group wherein the hydroxyl is attached to the alkyl group in the usual way. For instance, if diethyl amino ethanol is treated with lactic acid so as to form lactyl ethanol diethylamine of the following formula:

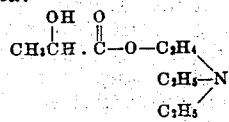

then it is understood that such material does not contain a hydroxy alkyl group and is not a hydroxy alkyl amine of the character herein referred to. If, on the other hand, triethanol amine were treated with lactic acid so as to give monolactyl triethanolamine of the following composition:

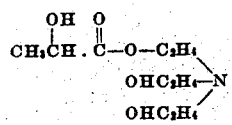

then such compound would be suitable due to the presence of one or more hydroxy alkyl radicals.

Suitable amines which may esterify with detergent-forming monobasic carboxy acids may be further exemplified by ethyl ethanol amine, methyl ethanol amine, diethanol ethyl amine, diethyl ethanol amine, triethanol amine, propanol amine, dipropanol amine, propyl propanol amine, tripropanol amine, dicyclohexanol amine, cyclohexyl ethanolamine, cyclohexyl propanol amine, benzylethanolamine, pentanolamine, hexanolamine, octylethanolamine, octadecylethanolamine, cyclohexanolethanolamine, cyclohexanoldiethanolamine, dicyclohexanol ethylamine, benzyl diethanolamine, benzyldipropanol amine, octadecyl diethanolamine, ethyl hexyl ethanolamine, etc.

It may be mentioned that many of the alkylol amines may be looked upon as derivatives of dihydric alcohols, or of the chlorhydrins of dihydric alcohols. For example, the alkylolamines may be formed in the following manner:

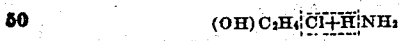

And the C$_2$H$_4$ radical may be any one of a number of hydrocarbon radicals which are aliphatic, alicyclic, or aralkyl in nature. It is apparent that similar derivatives are available from glycerols, polyglycerols and the like as indicated by the following reaction:

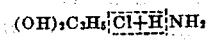

The same type of reactions will produce secondary or tertiary alkylol amines derived from primary and secondary amines such as amylamine, diamylamine, cyclohexyl amine, dicyclohexyl amine, benzylamine, etc. Thus there are a wide variety of hydroxy amines that may be employed to obtain suitable ester products and that may be exemplified by monoglycerylamine, diglyceryl amine, triglyceryl amine, monoglyceryl diethyl amine, monoglyceryl dipropylamine, diglyceryl propylamine, etc.

It should be recognized that the ester compounds contemplated according to the present invention are derived only from basic amines. The word "basic" is employed to exclude amines having little or no basicity such as ordinary aromatic amines or any amine having one or more aryl radicals directly joined to the nitrogen atom. Since the ester amine products are basic they are free from any aryl groups directly attached to the amine nitrogen and are not derived from aryl amines. On the other hand, suitable ester products are obtained solely from alkyl amines (alphyl, alicyclic, aralkyl, or alkyl oxy alkyl) having at least one hydroxyl group present. It is true that in aralkyl amines there is an aryl sub-group present, but it is not directly attached to the nitrogen atom as in the case of aryl amines and merely constitutes a substituted alkyl amine. For instance, we consider benzyl amine as being the primary amine, phenmethyl amine. Direct linkage between the amine nitrogen and a carboxylic carbon atom derived from a carboxyl group (e. g.

where RCO is an acyl group and N is the amine nitrogen) also has the effect of rendering the amine non-basic.

It must also be borne in mind that the ester products adapted for increasing the dirt removal rate of filtering media according to this invention, are still basic in character and exhibit characteristic properties of a basic amine. Thus the ester products may combine with various acids to form salts. For example, they may be combined with acetic acid, hydrochloric acid, lactic acid, chloracetic acid, nitric acid, butyric acid, phosphoric acid, or any suitable organic or inorganic acid to form salts. They also may combine with water to form a hydrated compound presumably a substituted ammonium compound, but not a quaternary ammonium compound, inasmuch as there is always one unsubstituted hydrogen atom of the ammonium radical present. The basic ester amines which may be used to increase the dirt removal rate of filtering media according to this invention therefore include the acid salt form and the hydrated form as well as the simple amine form. Accordingly, any ester amine product represented by the formula given hereinabove, namely,

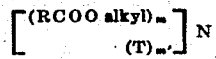

may be in any one of the following forms (wherein the

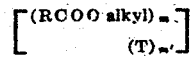

radical is represented as D for brevity:

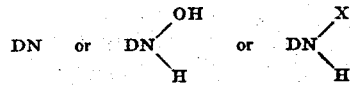

wherein X represents the acid radical of any acid employed to form a salt.

While the ester amide may be in the form of a salt, attention is called to the fact that the acyl-oxy group of the detergent-forming monobasic carboxy acid is attached to an alkyl group in an amino-hydrogen position by an ester linkage. Salts formed by reaction between the detergent-forming carboxy acid and an amine are not ester products and are unsuitable. For example a salt forming reaction such as

RCOOH+R'NHH→[HHR'NH] OOCR does not result in an ester amine and does not afford a compound adapted to increase the dirt removal rate of filtering media in the practice of this invention.

The manufacture of ester amine products from tertiary amines is relatively simple because no precautions are necessary to prevent amidification. The selected detergent-forming acid or ester, as for example a fatty acid or fatty acid ester, and the selected hydroxy non-aryl basic amine are mixed in suitable proportions and heated to some point above the boiling point of water, for instance, 110° C., and at a point below the decomposition point of the amine or of the fatty material, for instance, 180° C., for a suitable period of time, e. g. 2 to 8 hours. Mild agitation preferably is employed. A catalyst may be present such as sodium oleate, sodium carbonate, caustic soda, etc., in amounts such as .5% or less. As aforesaid the fatty body or the equivalent may be in the acid form or in the form of an ester, e. g., a glyceride. It is to be noted that the reactions do not take place to appreciable extent if the fatty acid or other detergent-forming acid has previously been converted to a soap or a salt and such soaps or salts are not functional equivalents of ester forming detergent-forming bodies. Ester amine products of the character herein defined when in the form of tertiary amines are regarded as preferable to ester amine products in the form of primary and secondary amines.

When one is employing a hydroxy secondary or primary amine in the esterification reaction, precautions should be taken so that one may obtain substantial quantities of products derived by esterification rather than amidification. This can conveniently be done by utilizing an ester of the detergent-forming acid such as the glyceride of a fatty acid, for example triricinolein. Other examples are ethyl hydroxy stearate, methyl naphthenate, ethylene glycol dinaphthenate, methyl abietate, ethylene glycol diabietate, naphthenin, abietin, etc. A selected glyceride for instance and a selected hydroxy non-aryl basic primary or secondary amine are mixed in suitable proportions and heated at some point above the boiling point of water and below the decomposition point of the amine or glyceride, for instance, between about 110° C. and 180° C., for a suitable period of time such as 4 to 24 hours with mild agitation. A catalyst of the character and amount above referred to may be employed. Since the detergent-forming acid is present in the form of an ester and not in the form of a free acid there is no tendency to form a salt of the detergent-forming acid, and, if the reaction is conducted at the lower range of temperatures there is a decided tendency to form the esterification products rather than the amidification products.

The reactions are carried out under substantially anhydrous conditions inasmuch as the reaction is carried out at temperatures above the boiling point of water and any water that is formed is driven off. The driving off of any water that is formed can be hastened by passing a dried inert gas through the reacting mass and thereby hasten esterification.

The manufacture of suitable ester amine products adapted to increase the dirt removal rate of filtering media in the practice of this invention may be illustrated by the following examples.

*Example I*

Castor oil (triricinolein) is mixed with commercial triethanolamine and the mixture is heated at 150° to 180° C., for about 2 hours with mild agitation. The reaction product may be used as such or may be converted into the acetate by the addition of the maximum amount of glacial acetic acid that can be added without causing acidity to methyl orange indicator.

Example II

Triglycerylamine (trihydroxy propyl amine) may be substituted for triethanolamine in Example I.

Example III

Dicyclo hexylamine is reacted with glycerol monochlorhydrin to produce monoglyceryl dicyclohexylamine which is substituted for triethanol amine in Example I.

Example IV

Dibenzylamine is reacted with glycerol monochlorhydrin to produce monoglyceryl dibenzylamine which is substituted for triethanol amine in Example I.

Example V

An amine represented by the formula

$N(C_2H_4OC_2H_4OH)_3$ is substituted for triethanol amine in Example I.

Example VI

Diamyl monoglycerylamine (1-di-amyl amino propane 2,3 diol) is substituted for triethanol amine in Example I.

Example VII

Dipropanol amine is substituted for triethanol amine in Example I.

Example VIII

Ethyl hydroxy stearate is substituted for castor oil in Examples I to VII.

Example IX

Olive oil is substituted for castor oil in Examples I to VII.

Example X

Methyl naphthenate is substituted for castor oil in Examples I to VII.

Example XI

Methyl abietate is substituted for castor oil in Examples I to VII.

According to the method of manufacture it is apparent that certain by-products appear such as glycerine, mono- or di-glycerides, etc. From a practical standpoint it is unnecessary to separate these cogeneric materials, although it would be possible to do so by conventional methods. It may be that some of the compounds which appear in the reaction mass are not completely identified as to their form. For example, it may be possible that condensation products are formed between amines of the kind contemplated herein and substances such as glycerol or a hydroxy alkyl amine, by virtue of other linkage. It is also possible when an hydroxylated fatty material such as castor oil is employed that there may be polymerization or condensation principally due to ether linkages and loss of water. In this connection, however, compounds of specific and definite chemical composition are formed in preponderant amounts which are of the character hereinabove mentioned.

Some of the ester amine products above defined are somewhat soluble in oil while others are substantially insoluble. If the product is such that only one part or less is soluble (as determined by usual visual methods) in ordinary straight-run kerosene from Pennsylvania crude, the product is to be regarded as substantially insoluble in oil. For use in increasing the dirt removal rate of filtering media according to this invention it is preferable that the ester product be substantially insoluble in oil. Absolute or total oil insolubility is undesirable. However, even a trace of solubility such as a few parts dissolving in about one hundred thousand parts of kerosene of the character above mentioned affords a satisfactory product for increasing the dirt removal rate of filtering media in the practice of this invention.

The production of preferred ester products which are substantially insoluble in oil or of low oil solubility can readily be achieved having in mind the following factors which influence the oil solubility of the product. Oil solubility can be decreased when the alkyl group or groups in the amino-hydrogen position is an oxy-alkyl group, especially a group containing an alkylene oxy group. Similarly oil solubility is decreased when the acyl-oxy group of the detergent-forming acid is attached to an alkylene oxy alkyl group. The oil solubility is also decreased when the acyl-oxy group contains a free hydroxyl and when the number of carbon atoms contained therein is relatively low. Compounds of the types referred to that have relatively low oil solubility are regarded as preferable. In particular it is preferable that the ester amine product contain in addition to the acyl-oxy group derived from a detergent-forming acid and connected to the amino-nitrogen through an alkyl group, an oxy alkyl group in an amino-nitrogen position such as $C_2H_4OH$, $C_2H_4OC_2H_4OH$, $C_2H_4OOCR'$; and

$C_2H_4OOCC_2H_4OH$

While there are other factors affecting oil solubility, the foregoing discussion is believed to be adequate to enable one to obtain ester products having desired properties of oil solubility. While it is preferable to employed ester products which are substantially insoluble in oil as defined above, those ester products which are more soluble in oil likewise may be employed. The ester products hereinabove described may be more or less soluble in water but water solubility is not of particular importance because water in more than very small amounts does not occur in the oil which is used in the lubricating system of an internal combustion engine and which is clarified by the use of a filter.

The products produced as above described which are suitable for increasing the dirt removal rate of filtering media are soluble in one or more of such solvents as lower aliphatic alcohols (ethyl to octyl) carbon tetrachloride, xylene, etc. Advantage of this property can be taken to facilitate application of the product to filters and filtering media.

The esterification product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if he product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in connection with a filter, a single filter can be made which can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clear it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additives may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

Basic amines which contain an acyl-oxy group derived from a detergent-forming monocarboxy acid having at least 8 carbon atoms and attached to an alkyl radical that in the amine occupies an amino-hydrogen position and which are esterified through an alcoholiform hydroxyl with an extraneous polybasic carboxylic acid such as phthalic, succinic, malic, fumaric, citric, citriconic, maleic, adipic, tartaric, fumaric, glutaric, diphenic, naphthalic, oxalic, meso-oxalic, pimelic, suberic, azelaic, sebacic, etc., are covered in our application Serial No. 381,127 filed Feb. 28, 1941, for Filters, and for this reason the claims in this case are limited to basic amines which do not contain an extraneous polybasic carboxy acid residue.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a basic ester amine which contains an acyl oxy group containing at least 8 carbon atoms derived from a detergent-forming monobasic carboxy acid having at least 8 carbon atoms and attached to an alkyl radical that in said ester amine occupies an amino-hydrogen position and which ester amine does not contain a polybasic carboxy acid residue.

2. A filter according to claim 1 wherein said acyl oxy group is derived from a fatty acid having 8 to 32 carbon atoms.

3. A filter according to claim 1 wherein said acyl oxy group is derived from an hydroxylated fatty acid having 8 to 32 carbon atoms.

4. A filter according to claim 1 wherein said acyl oxy group is a ricinoleic acid radical.

5. A filter according to claim 1 wherein said ester amine product is a tertiary amine.

6. A filter according to claim 1 wherein said ester amine contains in addition to the acyl oxy group derived from a detergent-forming monobasic carboxy acid having at least 8 carbon atoms, an oxyalkyl group in an amino-nitrogen position.

7. A filter according to claim 1 wherein said ester amine contains in addition to said acyl oxy group derived from a monobasic carboxy acid having at least 8 carbon atoms, an hydroxy ethyl group in an amino-nitrogen position.

8. A filter according to claim 1 wherein said ester amine is substantially oil insoluble.

9. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a compound represented by the formula

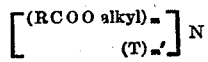

in which $m$ is 1, 2 or 3; $m'$ is 0, 1 or 2 with the proviso that $m+m'=3$; RCOO is an acyl oxy group containing at least 8 carbon atoms derived from a detergent-forming monobasic carboxy acid having at least 8 carbon atoms; and T is a hydrogen atom, or an alkyl radical, or a hydroxy alkyl radical, or a radical (R'COO alkyl) wherein R'COO is an acyl oxy group containing less than 8 carbon atoms derived from a monocarboxy acid having less than 8 carbon atoms.

10. A filter for use in connection with the lubricating system of an internal combustion engine comprising a casing containing a filtering medium sufficiently porous to permit oil to flow therethrough but sufficiently compact to filter out solid particles, said medium having applied thereto an agent to increase the dirt removal rate of said filtering medium, said agent comprising a basic ester amine which contains an acyl oxy group containing at least 8 carbon atoms derived from a detergent-forming monobasic carboxy acid having at least 8 carbon atoms and attached to an alkyl radical that in said ester amine occupies an amino-hydrogen position and which ester amine does not contain a polybasic carboxy acid residue.

11. A method of increasing the dirt removal rate of a filtering medium for removing dirt from the lubricating oil of an internal combustion engine, said method comprising contacting oil that is filtered by said filtering medium with a basic ester amine which contains an acyl oxy group containing at least 8 carbon atoms derived from a detergent-forming monobasic carboxy acid having at least 8 carbon atoms and attached to an alkyl radical that in said ester amine occupies an amino-hydrogen position and which ester amine does not contain a polybasic carboxy acid residue.

12. A method according to claim 11 wherein said acyl oxy group is derived from a fatty acid having 8 to 32 carbon atoms.

13. A method according to claim 11 wherein said acyl oxy group is derived from an hydroxylated fatty acid having 8 to 32 carbon atoms.

14. A method according to claim 11 wherein said acyl oxy group is a ricinoleic acid radical.

15. A method according to claim 11 wherein said ester amine is a tertiary amine.

16. A method according to claim 11 wherein said ester amine contains in addition to the acyl oxy group derived from a detergent-forming monobasic carboxy acid having at least 8 carbon atoms, an oxy alkyl group in an amino-nitrogen position.

17. A method according to claim 11 wherein said ester amine contains in addition to said acyl oxy group derived from a monobasic carboxy acid having at least 8 carbon atoms, an hydroxy ethyl group in an amino-nitrogen position.

18. A method according to claim 11 wherein said ester amine is substantially oil insoluble.

19. A method of increasing the dirt removal rate of a filtering medium for removing dirt from the lubricating oil of an internal combustion engine, said method comprising contacting oil that is filtered by said filtering medium with a compound represented by the formula

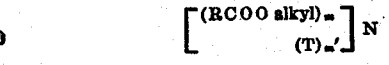

in which $m$ is 1, 2 or 3; $m'$ is 0, 1 or 2 with the proviso that $m+m'=3$; RCOO is an acyl oxy group containing at least 8 carbon atoms derived from a detergent-forming monobasic carboxy acid having at least 8 carbon atoms; and T is a hydrogen atom, or an alkyl radical, or a hydroxy alkyl radical, or a radical (R'COO alkyl) wherein R'COO is an acyl oxy group containing less than 8 carbon atoms derived from a mono carboxy acid having less than 8 carbon atoms.

DONALD H. WELLS.
MELVIN DE GROOTE.